United States Patent [19]

Jensen et al.

[11] 4,087,388

[45] May 2, 1978

[54] PROCESS OF PREPARING A PERMSELECTIVE MEMBRANE

[75] Inventors: James Henry Jensen; Lynn E. Applegate, both of Wilmington, Del.

[73] Assignee: E. I. Du Pont de Nemours and Company, Wilmington, Del.

[21] Appl. No.: 734,632

[22] Filed: Oct. 21, 1976

[51] Int. Cl.$^2$ ................................................ C08J 9/26
[52] U.S. Cl. ........................... 260/2.5 M; 210/500 M; 260/2.5 N; 264/41; 264/49
[58] Field of Search ............... 264/41, 49; 210/500 M; 260/2.5 M

[56] References Cited

U.S. PATENT DOCUMENTS

| 3,483,283 | 12/1969 | Fukushima et al. | 264/49 |
| 3,772,072 | 11/1973 | Brown et al. | 264/49 |
| 3,816,575 | 6/1974 | Susuki et al. | 264/49 |

*Primary Examiner*—Morton Foelak

[57] ABSTRACT

The water flux rate (i.e., rate of water flow) through an aromatic nitrogen-linked synthetic organic polymer membrane in separation processes, such as reverse osmosis, is improved by incorporating a selected non-ionic, anionic or ampholytic surfactant into the rinse medium used to quench and extract salts and solvent from the membrane during preparation. The surfactant can be, inter alia, a water-soluble polyethylene glycol ester. The surfactant is effective in improving water flux in amounts ranging from between about 50 p.p.m. to about 10,000 p.p.m. based on rinse medium.

16 Claims, No Drawings

PROCESS OF PREPARING A PERMSELECTIVE MEMBRANE

BACKGROUND OF THE INVENTION

1. Field of the Invention

This invention relates to an improved process for the selective separation of components of aqueous compositions by reverse osmosis or ultrafiltration. More particularly, this invention is directed to a process for obtaining membranes made of aromatic nitrogen-linked synthetic organic polymers.

2. Description of the Prior Art

Permeation selective (i.e., permselective) membranes which preferentially permeate certain components of liquid mixtures while retaining other components, have long been known, as has the principle of reverse osmosis, wherein a hydrostatic pressure in excess of the equilibrium osmotic pressure of a liquid mixture is applied to the mixture to force the more permeable components of the mixture, usually water, through the membrane in preference to the less permeable components, usually a salt, contrary to normal osmotic flow. Recent research in this field has been directed primarily toward the development of membranes for the reverse osmosis desalination of brackish and sea waters on a practical scale.

It is well known that complete separation of the more permeable from the less permeable components of liquid mixtures is never obtained with permselective membranes in practical use. All components of a mixture permeate to some degree through any membrane which has a practical permeation flux rate for the more permeable components. A principal goal with such membranes has been the production of membranes with economically attractive optimum balances of high flux rates for the more permeable components and high rejection efficiencies for the less permeable salt components of liquid mixtures. Aromatic nitrogen-linked synthetic organic polymers, such as those described in Richter and Hoehn U.S. Pat. No. 3,567,632, have been found useful in this respect, and continuing effort has been made to improve upon the balance of flux rate and the salt rejection properties of such membranes. For example, salt rejection is improved by contacting the membranes with hydrolyzable tannins as disclosed by Chen and Ganci U.S. Ser. No. 562,246 filed Mar. 26, 1975; or by contacting the membranes with a hydrous heavy metal composition as disclosed by Ganci U.S. Pat. No. 3,853,755; or by contacting the membranes with a selected ether as disclosed by Ganci, Jensen and Smith U.S. Pat. No. 3,808,303. As is seen, the effort has been directed toward enhancing the salt rejection properties by treatment of the membrane after it has been prepared.

In contrast, in the present invention, the water flux rate, rather than the salt rejection properties, has been improved over the rate of membranes not subjected to the treatment of this invention. In addition, in the present invention, the water flux rate is enhanced, not by treatment of the membrane, but rather by treatment during preparation of the membrane.

SUMMARY OF THE INVENTION

The embodiments of the invention are summarized as follows:

1. In the process for preparing a permselective membrane, which comprises extracting an unextracted membrane comprising
   A. a water-miscible organic polar aprotic solvent present in the unextracted membrane in an amount of between about 20% and about 75% by weight based on weight of unextracted membrane;
   B. a substantially linear, aromatic, synthetic, organic, nitrogen-linked, condensation polymer present in the unextracted membrane in an amount of between about 25% and about 80% by weight based on total weight of the unextracted membrane;
   C. at least one salt which is soluble in the solvent and is present in the unextracted membrane in an amount of between about 10 and about 100% by weight based on weight of polymer;

with a rinse medium which is miscible with the solvent, is a solvent for the salt, is practically chemically inert toward the polymer and is practially a non-solvent for the polymer; the improvement which comprises employing in the rinse medium between about 50 p.p.m. and 10,000 p.p.m. of a surfactant having a molecular weight between about 200 and about 7000, and containing (a) at least one hydrophobic moiety having a molecular weight of between about 100 and about 400 and being a hydrocarbyl group or such a hydrocarbyl group substituted with halogen, $-NO_2$ or OH; and (b) at least one hydrophilic moiety, said surfactant being
   i. a nonionic surfactant or
   ii. an anionic surfactant, or
   iii. an amphotlytic surfactant of the formula

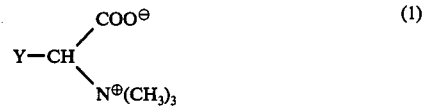
(1)

wherein Y is hydrocarbyl of between about 6 and about 20 carbon atoms which can be substituted with halogen, $-NO_2$ or $-OH$.

DESCRIPTION OF THE INVENTION

In the permselective membrane aspect of the invention, the membranes can be in any of several forms, such as thin coatings on porous substrates, thin films supported by porous substrates, thin-walled hollow fibers, etc. The porous substrates in turn can be shaped as tubes supporting either internal or external membranes, as, for example, flat plates or corrugated sheets. Typical apparatus for employing the membranes in reverse osmosis separation applications are described in Richter and Hoehn U.S. Pat. No. 3,567,632, particularly in the apparatus depicted in FIGS. 1, 2, 5 and 9 thereof.

As used herein, the term "permselective" means the ability to preferentially permeate one or more components of a liquid mixture while simultaneously restraining permeation of one or more other components. The flux rates of permselective membranes are conveniently expressed in terms of the quantity of a component of the feed mixture which permeates in a given time through a membrane of a given size under a specified pressure.

The solute rejection efficiencies of reverse osmosis membranes for water permeation are conveniently expressed in terms of the percentage of the salt in the water feed mixture which is passed by the membrane. The concentrations of salts in permeates and feeds may be determined conductometrically or by chemical analysis.

Preferably, the permselective membranes of this invention are employed where the solute to be preferentially rejected is a dissociated salt, such as sodium chloride, sodium sulfate, and calcium chloride, and the salt is preferentially rejected from an aqueous solution while water passes through the membrane counter to the normal osmotic direction of flow under the influence of a pressure greater than the osmotic pressure of the solution.

Permselective membranes desirably have high flux rates for one or more components of the mixture separated and high rejection efficiencies for one or more other components. The improved membranes of this invention have flux rates higher than similar membranes prepared without the surfactant present in the rinse medium used during preparation of the membranes. Particularly beneficial results can be obtained by combining the flux rate improvement of the present invention with the methods for improving the salt rejection that are described in the section titled "Description of the Prior Art".

Permselective membranes are also useful in such processes as dialysis and ultra-filtration. Improvement in flux rate is also a very desirable feature of dialysis and ultrafiltration, (a process in which very tiny particles are removed from a fluid by forcing the fluid through a permeable membrane). For ultra-filtration, good salt rejection is not important.

1. The Polymers

The polymers employed herein are substantially linear aromatic synthetic organic nitrogen-linked condensation polymers having the general formula

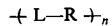

in which
  i. each —L— group, as it occurs along the polymer chain, is independently a linking group,
  ii. each —R— group, as it occurs along the polymer chain, is independently an organic radical,
  iii. the degree of polymerization is indicated by n, an integer sufficiently large to provide film-forming molecular weight. The terminal groups will depend on the L and R groups present.

By the term "independently" is meant that each —L— or —R— group may be the same as or different from each other —L— or —R— group along the same polymer backbone chain.

"Condensation polymers" contain a backbone chain composed of alternating —L— groups and —R— groups which is formed by a condensation polymerization reaction as contrasted to a free-radical polymerization reaction. Polymers are useful which have molecular weights of sufficient magnitude so that they are film-forming or fiber-forming and have a non-tacky surface at room temperature when dry. Polymers with an inherent viscosity above about 0.6 are useful and polymers whose inherent viscosity is between about 0.8 and about 3.0 are preferred.

"Nitrogen-linked" polymers contain nitrogen atoms in the polymer chain as linking parts of at least about 50 percent of the —L— groups. They can also contain other nitrogen atoms either as part of or attached to the —R— groups. Any remaining linking groups can be other functional groups formed by condensation reactions, such as ether and ester groups.

"Synthetic organic" polymers are "man-made" in the usual connotation and are composed substantially of carbon, hydrogen, oxygen, nitrogen, and sulfur. These polymers can also contain minor amounts of other atoms.

"Aromatic" polymers are polymers in which at least about 50 percent of the —R— groups contain a 5-membered or 6-membered ring system subject to resonance bonding and which can contain hetero atoms such as oxygen and nitrogen.

"Substantially linear" polymers are substantially straight chain ones which exhibit the general solubility and melting properties characteristic of linear polymers as contrasted to highly cross-linked polymers but can contain minor amounts of cross-linked and chain branched structures.

The permselective membranes useful in accordance with this invention can be composed of polymers containing repeated +L—R+$_n$ units of a single type or of polymers containing repeat units of two or more different types. Repeat units of different types may result from the presence of different —L— groups, from the presence of different —R— groups, or from both. When the polymers contain different —L— groups and different —R— groups, they can be in an ordered sequence or in a random sequence. The membranes can also be composed of compatible physical mixtures of polymers of any of the above-described a. Linking group L: The —L— groups in the general formula +L—R+$_n$ are preferably independently chosen so that at least 50 percent of the —L— groups in each polymer backbone chain contain at least one of each of the structures

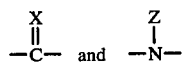

in any sequence such that no one structure of either of these types is adjacent to more than one other structure of the same type. It should be understood that the structures of the linking groups recited herein are given without regard to the direction in which the structures are read; that is, these linking groups can appear both as recited and as the reverse structure in a single polymer chain.

In one class of polymers useful in membranes of this invention, each "X" in the

structure can be independently oxygen or sulfur, and is preferably oxygen, and each "Z" in the

structures can be independently hydrogen, a one to four carbon alkyl, or phenyl, and preferably at least one-fourth of all the "Z's" are hydrogen. Typical examples of —L— groups of this class of polymers are

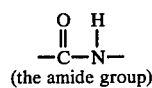

(the amide group)

-continued $$\overset{O}{\underset{\|}{-C}}-\overset{O}{\underset{\|}{C}}-\overset{H}{\underset{|}{N}}-$$ (b)

(the oxamide group)

$$\overset{O}{\underset{\|}{-C}}-\overset{H}{\underset{|}{N}}-\overset{H}{\underset{|}{N}}-$$ (c)

(the acyl hydrazide group)

$$\overset{O}{\underset{\|}{-C}}-\overset{H}{\underset{|}{N}}-\overset{H}{\underset{|}{N}}-\overset{O}{\underset{\|}{C}}-$$ (d)

(the diacyl hydrazide group)

$$\overset{H}{\underset{|}{-N}}-\overset{O}{\underset{\|}{C}}-\overset{H}{\underset{|}{N}}-\overset{H}{\underset{|}{N}}-,$$ (e)

(the semicarbazide group),

L can also be $$-N\begin{matrix}\diagdown\overset{O}{\underset{\|}{C}}-\\ \diagup\overset{}{\underset{\|}{C}}-\\ \overset{}{\underset{\|}{O}}\end{matrix}$$

in which the fourth valences of the carbonyl carbon atoms are linked vicinally to an aromatic ring in the polymer chain structure so that the complete unit forms an imide structure of the type <p style="text-align:center;">[imide-phenyl structure]</p>

In preferred polymers of this type, two such units are combined in a structure of the type <p style="text-align:center;">[bis-imide structure with E]</p> in which E is a tetravalent aromatic radical which can be a monocarbocyclic, monoheterocyclic, fused carbocyclic, or fused heterocyclic radical or of the formula <p style="text-align:center;">[two phenyl rings linked by $Y_p$]</p> in which p is zero or one and Y is a divalent radical such as —CO—, —O—, —S—, —SO$_2$—, —NH—, and lower alkylene.

In another class of polymers useful in membranes of this invention, each $$\overset{X}{\underset{\|}{-C-}}$$

structure in the —L— groups can be a $$\overset{N-}{\underset{\|}{-C-}}$$

group in which the third valence of the nitrogen atom is linked to an aromatic ring which is also separated from the $$\overset{N-}{\underset{\|}{-C-}}$$

group in the polymer chain by an $$\overset{Z}{\underset{|}{-N-}}$$

structure linked to the aromatic ring vicinally to the $$\overset{N-}{\underset{\|}{-C-}}$$

structure so that the complete unit forms a benzimidazole structure of the type

<p style="text-align:center;">[benzimidazole structure with Z]</p>

In the preferred polymers of this type, two such units are combined in a structure of the type <p style="text-align:center;">[bis-benzimidazole structure with E and Z]</p> in which Z and E are radicals as defined above.
Preferably L is $$\overset{O}{\underset{\|}{-C}}-\overset{H}{\underset{|}{N}}- \text{ (amide).}$$

b. The organic group R

The organic radical —R— groups in the general formula $\text{--}L\text{--}R\text{--}_n$ are preferably independently chosen so that at least about 50 percent of the groups in each polymer backbone chain are aromatic radicals which can be monocarbocyclic, monoheterocyclic, fused carbocyclic, or fused heterocyclic or of the formula <p style="text-align:center;">[two phenyl rings linked by $Y_p$]</p> in which p is zero or one and Y is a divalent group as defined above. These aromatic radicals can be unsubstituted or can have substituents which do not change the fundamental characteristics of the polymer. The most preferred substituents are the sulfonic acid group and the carboxyl group.

Any remaining —R— groups can be saturated aliphatic, carbocycloaliphatic or heterocycloaliphatic radicals with non-vicinal points of attachment or alkylene radicals having less than about six carbon atoms between points of attachment.

Preferably the membranes useful as taught herein are made of polymers which contain two or more different phenylene —R— groups. A particularly preferred class of polymers are those in which about 50 to 90 percent of the —R— groups are metaphenylene groups and about 10 to 50 percent of the —R— groups are paraphenylene.

c. "n" in the formula ⁺[—L—R—]$_n$ is the degree of polymerization and is an integer sufficiently large to provide a film-forming molecular weight.

The polymers useful herein can generally be prepared as described in Richter and Hoehn U.S. Pat. No. 3,567,632.

d. Preferred Polymer Classes

Preferred aromatic polyamides suitable for use in membranes of this invention include those of the recurring structural group

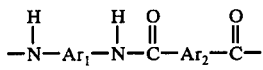

in the polymer chain, where Ar$_1$ and Ar$_2$ are substituted or unsubstituted divalent aromatic radicals wherein the chain-extending bonds are oriented meta or para to each other and any substituents attached to the aromatic nucleus are not condensed with reactants during polymerization. Included are the polymers described in Kwolek et al. in U.S. Pat. No. 3,063,966. Wholly aromatic film- and fiber-forming polyamides of this structure can be generally prepared by the condensation of one or more aromatic diamines with one or more aromatic diacid dihalides as described by Hill et al. in U.S. Pat. No. 3,094,511, by Preston in U.s. Pat. Nos., 3,232,910 and 3,240,760, in British Pat. No. 1,104,411, and by P. W. Morgan in Condensation Polymers, Polymer Review, vol. 10, Interscience Publishers, New York (1965); by self-condensation of one or more aromatic amino acid chlorides as described in French Pat. No. 1,526,745; or by reacting one or more aromatic amino acid chlorides with one or more aromatic diamines and then reacting the resulting intermediate with one or more dibasic acid chlorides. Preferably the polyamide has an inherent viscosity of about 1 to 2.5 as determined on a solution of 0.5 gram of polymer in 100 milliliters of dimethyl acetamide solution containing 4 grams of lithium chloride at 25° C. Magat describes in U.S. Pat. No. 3,184,436 the preparation of polyamides containing sulfonic acid moieties which are particularly useful in making membranes to be treated as described herein.

In an especially preferred class of polymers, substantially all the —L— groups are amide groups and the —R— groups are phenylene groups. These polymers are obtained by condensation of a phthaloyl chloride mixture with a phenylenediamine mixture such as mixtures containing metaphenylenediamine and/or paraphenylene diamine and similar mixtures containing a derivative of a phenylenediamine such as the calcium salt of metaphenylenediamine sulfonic acid.

Polyimides preferred for use in membranes of this invention include those obtained by the action of heat and, optionally, of chemicals upon polyamide-acids as taught for example, by Koerner et al. in U.S. Pat. No. 3,022,200 and in the other patents and applications mentioned by Dinan in U.S. Pat. No. 3,575,936. Useful polyamide-acids include those of the AB type formed by self-condensation of an amino aromatic dicarboxylic acid anhydride or acid salt thereof as well as those of the AA-BB type formed by reaction of an aromatic tricarboxylic acid anhydride or acid halide thereof, or of an aromatic tetracarboxylic acid dianhydride, with an organic diamine. The preferred polyamide-acids are characterized by the structure.

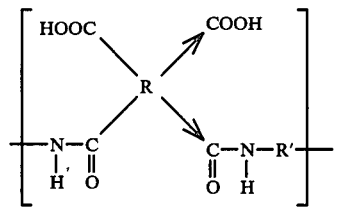

wherein → denotes isomerism, R is a tetravalent organic radical containing at least two carbon atoms, no more than two carbonyl groups of each polyamide-acid unit being attached to any one carbon atom of the tetravalent radical, and R' is a divalent radical containing at least two carbon atoms, the amide groups of adjacent polyamide-acid units each being attached to separate carbon atoms of the divalent radical. Either the R of the tetracarboxylic acid dianhydride or the R' of the organic diamine can be an aromatic radical, an aliphatic radical, or a combination of aromatic and aliphatic bridged radicals wherein the bridge is carbon, oxygen, nitrogen, sulfur, silicon, or phosphorus, and substituted groups thereof, so long as at least about 50 percent of these radicals contain 5-membered and 6-membered ring systems subject to resonance bonding.

Aromatic polyhydrazides preferred for use in membranes of this invention embrace high molecular weight aromatic condensation polymers derived from hydrazine which are film- and fiber-forming. Preferably they are characterized by the recurring structural unit

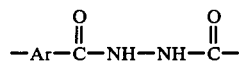

in the polymer chain, where Ar is a divalent aromatic radical having at least three nuclear atoms between points of attachment, at least 35 mole percent of the aromatic radicals in any polyhydrazide being other than paraphenylene radicals. Polymers with this structure include the condensation products of hydrazine or aromatic dihydrazides, e.g. a 50:50 weight ratio mixture of isophthalic dihydrazide and ethylene bis-4-benzoyl hydrazide, and a mixture of aromatic diacid chloride, e.g. a mixture of isophthaloyl chloride and terephthaloyl chloride. The preparation of typical polymers of this type is described by Frazer in U.S. Pat. No. 3,130,182, by Frazer and Wallenberger in the Journal of Polymer Science, part A, vol. 2, pages 1137–1145 and 1147–1156 (1964), and by Frazer et al. in the Journal of Polymer Science, part A, vol. 2, pages 1147–1169 (1960).

Poly(amide-hydrazides) preferred for use in membranes of this invention include polymers containing both amide and hydrazide linking groups. Preferred polymers exhibiting this structure include those obtained by condensation of one or more diacid chlorides, for example a mixture of 50 to 90 percent by weight of isophthaloyl chloride and the balance terephthaloyl chloride, with a mixture of metaphenylenediamine with at least one dihydrazide, for example ethylene-1-(3-oxybenzoic)-2-(4-oxybenzoic) dihydrazide. A particularly preferred polymer for use in the membranes in accordance with this invention is the polymer synthesized from a mixture of 80 mole percent of 3-aminobenzhydrazide and 20 mole percent of 4-aminobenzhydrazide and a mixture of 70 mole percent isophthaloyl chloride and 30 mole percent terephthaloyl chloride. The preparation of such polymers is described by Culbertson and Murphy in Polymer Letters, vol. 5, pages 807–812 (1967).

Aromatic polybenzimidazoles preferred for use in membranes in accordance with this invention are characterized in recurring structural units of the type

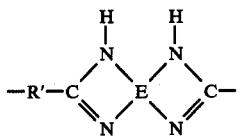

in which —R'— is a divalent radical as previously described and E is a tetravalent aromatic radical such as those of the types

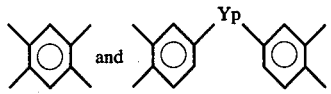

in which $p$ is zero or one and Y is a divalent radical as defined above. These aromatic polybenzimidazoles can be prepared, for example, by the condensation of one or more aromatic tetramines of the type.

with one or more dicarboxylic acid chlorides of the formula

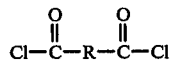

as disclosed by Marvel et al. in U.S. Pat. No. Re. 26,065, based upon U.S. Pat. No. 3,174,947, and also in articles by Marvel et al. in the Journal of Polymer Science, vol. 50, pages 511–529 (1961) and in the Journal of Polymer Science, part A, vol. 1, pages 1531–1541 (1963). Polymers of the same general type can also be derived from bis-(3,4-diaminophenyl) compounds of the type

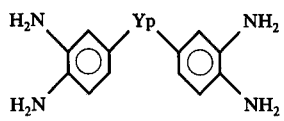

as described by Foster and Marvel in the Journal of Polymer Science, part A, vol. 3, pages 417–421 (1965). Other tetraamino compounds suitable for use in making such polymers are described by Brinkley et al. in U.S. Pat. No. 2,895,948.

The polymers useful in membranes as taught herein are preferably soluble in certain water-miscible dipolar aprotic solvents so that they can be put readily into membrane form as described Richter and Hoehn in U.S. Pat. No. 3,567,632. The polymers preferably have a solubility of at least about 10 percent by weight at 25° C. in a medium consisting essentially of 0 to 3 percent by weight of lithium chloride in a solvent selected from the group consisting of dimethylacetamide, dimethylsulfoxide, N-methylpyrrolidone, hexamethylphosphoramide, and mixtures thereof.

2. Preparation

The membranes are prepared by first dissolving the polymer in a solvent. The solvent is a water miscible polar aprotic organic solvent. By water miscible is meant any solvent which is capable of mixing with water in all proportions without separation. By polar aprotic is meant any solvent which has a dielectric constant greater than about 15, and, although it can contain hydrogen atoms, cannot donate suitable labile hydrogen atoms to form strong hydrogen bonds with an appropriate species. Especially preferred water miscible polar aprotic organic solvents include N,N-dimethylformamide, dimethylsulfoxide, tetramethylurea, N-methylpyrrolidone, dimethylacetamide, tetramethylene sulfone, and hexamethylphosphoramide.

The preferred solvents can be represented by the formula

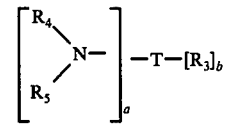

where $R_3$, $R_4$, and $R_5$ may be the same or different and are 1 to 4 carbon alkyl or alkylene radicals so chosen that the total number of carbon atoms in all of $R_3$, $R_4$, and $R_5$ is not more than 6, $a$ is 1 or 2, $b$ is 0 or 1, T is an acidic radical such as

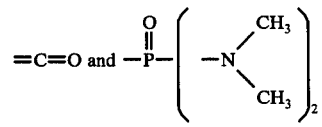

and the sum of $a + b$ is such as to satisfy the above-indicated valences of the radical T. While $R_3$, $R_4$ and $R_5$ as indicated can be separate alkyl groups, any two of these groups can be present in combination as an alkylene group, thus forming a heterocyclic ring structure. When such a heterocyclic ring is present, the ring must contain 5 or 6 nuclear atoms in all.

A salt is then added. The salt is soluble in the polymer and can comprise between about 10% and 100% by weight based on the weight of the polymer. For hollow fiber preparation, 10 to 40% salt is employed because greater amounts affect spinning performance.

The salts usually increase the water permeability of the final membrane at least roughly in proportion to the volume percent of the salt present, based on the volume of the polymer. The volume fraction of the salt present can be calculated from the weights of the salt and polymer and their respective densities. The densities of many suitable salts are listed in the "Handbook of Chemistry and Physics", published by the Chemical Rubber Publishing Company. Although the densities of different polymers vary somewhat, it has been found that a value of 1.31 grams per cubic centimeter can be used, without substantial error in calculating the volume fraction of salts, as the density of any polymer useful in making the membranes described herein.

The type of salt present influences the permeability and separation effectiveness of a membrane obtained therefrom. Contemplated soluble salts include the salts of Groups IA and IIA metals of the Periodic Table and are preferably highly dissociated, are soluble in the amount present, and are chemically inert toward the other materials involved in the process. Suitable salts include lithium chloride, lithium bromide, lithium nitrate, calcium nitrate, and calcium chloride. A desired balance of properties can frequently be obtained by the optimum choice of the type and amount of polymer salt in the solution.

Mixtures of two or more salts are preferred for preparing hollow fiber membranes. Particularly preferred are salts containing mixtures of between about 5 percent and 25 percent lithium nitrate and about 5 percent to 15 percent lithium chloride in which the combined amounts of lithium nitrate and lithium chloride are between about 10 percent and 40 percent, based on weight of polymer.

Preferably the polymer is added to the solvent and then the salt or salts are added simultaneously or in any order. However, the order of addition is not critical. The ingredients are added in amounts sufficient to produce the concentrations recited further above. Preferably the polymer will be present in an amount of between 12 and 40% by weight. Temperature and pressure during addition are not critical. Ordinarily, a temperature between 20° to 80° C. and atmospheric pressure are employed. The mixed solution is employed to prepare permselective membranes, and ordinarily the solution will be concentrated by heat and vacuum to obtain a polymer content of between about 18% and about 40% by weight, based on total weight of solution for fibers, and between about 10% and about 30% for films.

The membranes may be prepared either by casting a film or spinning a hollow fiber from the concentrated solution.

In preparing films, the solution should preferably contain 15 to 18% polymer solids based on total weight of solution, and 20 to 50% salt based on weight of polymer. The solution can be filtered through a fine filter and poured onto a substrate, while carefully excluding dust and other foreign matter. The film is spread with a doctor knife to a thickness of about 2 to 40 mils (0.051–1.02 mm), and dried at a temperature between 75° and 150° C.

In preparing hollow fibers the spinning solution will preferably contain 28 to 30% polymer solids by weight and about 20 to 22% salt concentration based on weight of polymer. The hollow fibers can be made by spinning a heated solution of a suitable polymer through annular spinnerets of the types described by Burke et al. in U.S. Pat. No. 3,397,427 at temperatures between about 110° C, and about 150° C., typically between 120° and 130° C. A usually desirable partial drying of the spun filaments can be obtained by passing them immediately after extrusion through a heated cell through which is also passed a heated inert gas.

After casting the film or spinning the hollow fiber, the resulting product, called a "protomembrane", contains solvent and salt. Thus, the protomembrane will contain about 25 to 80% by weight of polymer, based on weight of protomembrane, about 20 to 75% by weight of organic polar aprotic solvent and about 10% to 100% by weight of salt based on weight of polymer. The term "protomembrane" means a shaped structure (e.g., film or hollow fiber) which is form stable. The solvent and salt are exchanged and extracted with a rinse medium that is a solvent for the salt, is miscible with the solvent and is practically chemically inert toward the polymer and is practically a nonsolvent for the polymer. Thus, the rinse medium extracts most of the solvent and the salt from the protomembrane to form the membrane. Suitable rinse media include water, methanol, ethanol and the like. The protomembrane should be contacted with the rinse for a time sufficient to extract at least 75% of the salt or at least 75% of the solvent. Preferably, substantially all the salt and solvent are removed. The temperature of the rinse medium should be between about 0° C and 40° C.

Extraction of the salts, and any remaining solvent from protomembranes in preparing permselective membranes can be carried out continuously or batchwise. The membranes are cooled and partially extracted by flooding with water or with recycled water containing the extract, immediately after formation of the protomembrane.

In the improved process of this invention, a selected surfactant is added to the rinse medium.

The surfactant is defined as set forth in the Summary. Generally, surfactants, sometimes called surface active agents, form micelles and lower the surface tension at relatively low concentrations in aqueous solution.

The term "nonionic" means that the surfactants hydrophilic and hydrophobic moieties are not positively or negatively charged.

The term "anionic" means that the surfactant contains the hydrophobic moiety in a group that is negatively charged.

The term "ampholytic" means that the surfactant contains both an acidic and a basic function in the hydrophilic moiety.

The greatest increase in water flux is observed with ampholytic and nonionic surfactants. Of these two classes, the ampholytic surfactant is especially preferred because usually the salt rejection efficiency does not decrease or decreases only an insignificant degree. The salt rejection efficiency may decrease in some membranes, but this decrease can be overcome by treatment of the membranes after preparation by procedures described previously in the "Description of the Prior Art" section.

The nonionic surfactants preferably are the reaction products of ethylene oxide and optionally propylene oxide with other components which impart hydrophobic moieties to the resultant surfactant, such as alcohols, acids and alkyl phenols. The most preferable nonionic surfactants can be represented by the formulae:

(1) 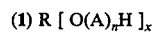

wherein $(A)_n$ is the group $+C_2H_4O+_n$ or a mixture of the groups $+C_2H_4O+_a$ and $+C_3H_6O+_b$, wherein $n$ in each instance is an integer of from 4 to 150 and preferably 6 to 18, $b$ is an integer of from 2 to 50 and preferably 2 to 18, $b$ is an integer of 0 to 30, and $a$ is an integer of at least 2, $a + b$ being equal to $n$; $x$ is an integer of 1, 2, or 3; and R is an aliphatic hydrocarbon group which can be saturated or unsaturated, straight-chain, branched, or cyclic, or combinations thereof and will generally contain from 8 to 24 carbon atoms, preferably from 8 to 18 carbon atoms; examples of R groups include stearyl, lauryl, decyl and the groups derived from aliphatic glycols and triols;

(2) $R'—C_6H_4O(B)_mH$, wherein B is the group $+C_2H_4O+_c$ or a mixture of the groups $+C_2H_4O+_c$ and $+C_3H_6O+_d$, wherein $m$ in each instance is an integer of from 4 to 150 and preferably 8 to 20, $d$ is an integer of 0 to 30, $c$ is an integer of at least 2, $c + d$ being equal to $m$; R' is a monovalent aliphatic and usually saturated radical containing 4 to 20 carbon atoms and preferably 8 to 12 carbon atoms;

$$R^3—CON[(CH_2CH_2O)_pH]_z, \quad (3)$$
$$\overset{R^2}{|}$$

wherein $p$ is an integer of 2 to 150, $z$ is an integer of 1 or 2, $R^3$ is an alkyl group containing 1 to 8 carbon atoms, $R^2$ is a chemical bond to a group $+CH_2CH_2O)_pH$ when $z$ is 2, and an alkyl group of 1 to 8 carbon atoms when $z$ is 1, with the proviso that at least 5 carbon atoms are provided by $R^2 + R^3$, 4. the polyalkylene oxide block copolymers of the formula $$HO(C_2H_4O)_e(C_3H_6O)_f(C_2H_4O)_gH,$$

wherein $f$ is an integer of from 15 to 65 and $e$ and $g$ are integers sufficiently large that $e + g$ total 20 to 90 percent of the total weight of the polymer.

(5) $CH_3(CH_2)_6CH_2(OCH_2CH_2)_3OH$;

(6) $CH_3(CH_2)_{10}CH_2(OCH_2CH_2)_{12}(OCH(CH_3)CH_2)_5OH$;

(7) $CH_3(CH_2)_8CH_2(OCH_2CH_2)_{10}OH$;

(8) $CH_3(CH_2)_8CH_2(OCH_2CH_2)_5OH$; and

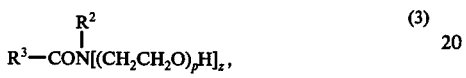  (9)

Most preferably the nonionic surfactant is one in which the formula is $R[O(A)_nH]$ wherein R is acyl $+R'CO+$ of 8 to 20 carbon atoms, (A) is $+CH_2CH_2O+$, and $n$ is a cardinal number of between 8 and 18 and R' is alkyl, aryl, aralkyl or alkaryl. Preferably R' is alkyl.

The anionic surfactant is preferably one of the formula AM where M is a cation, such as $Na^+$, $Li^+$ or $NH_4^+$ and A is an anion containing a hydrophobic hydrocarbyl group of 8-20 carbon atoms. Preferably A will have the formula $R''A'^-$ wherein R'' is alkyl of 8-20 carbon atoms and A' is $—COO^-$, $—SO_3^-$ or $—O—SO_3^-$.

The ampholytic surfactant is a betaine of the formula

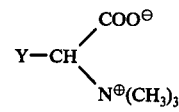

wherein Y is preferably alkyl of 8-15 carbon atoms.
Representative specific surfactants include

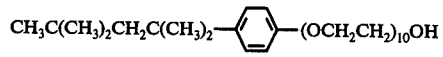

-n-decyl polyethylene glycol,
polyethylene glycol monolaurate
polyethylene glycol monostearate having a molecular weight in the glycol portion of 400, 600, 800, 1000 or 6000

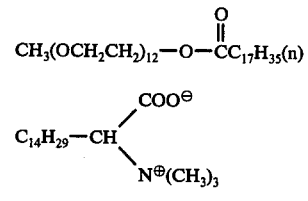

$CH_3(CH_2)_{11}—O—SO_3Na$ and the like.

The amount of surfactant in the rinse medium will be between about 50 p.p.m. and 10,000 p.p.m. based on rinse medium. Preferably the amount will be between 100 and 5000 p.p.m.

The effect of the surfactant is believed to be due to opening of the membrane structure during solidification. Sometimes the surfactant is absorbed onto the membrane which causes the flux rate to be lowered. To counteract any absorption tendency, the amount of surfactant employed can be lowered.

In order to observe the enhancement of water flux properties in hollow fiber membranes, it is sometimes advantageous to anneal the fibers after extraction of solvent and salt. The membranes can conveniently be annealed by subjecting them to water at 40°-80° C for about ½ to 1½ hours.

The following examples illustrate this invention. The parts of materials recited therein are by weight unless otherwise indicated. The percentage of polymers in solution are based on the total weights of the solutions. The percentages of salts present in polymer solutions are based on the weights of polymers in the solutions unless otherwise indicated. Polymer inherent viscosities are determined with 0.5 grams of polymer in a solution of 4 grams of lithium chloride in 100 milliliters of dimethylacetamide unless otherwise indicated.

EXAMPLE I

This example illustrates the fiber properties obtained with surfactant present in the rinse medium using a rinse medium temperature of 13° C.

A polyamide was prepared from a 67/33 mixture of metaphenylenediamine and metaphenylenediamine 4-sulfonic acid calcium salt, a 70/30 mixture of isophthaloyl chloride and terephthaloyl chloride, substantially as described in Example I of U.S. Pat. No. 3,775,361. The inherent viscosity of the polymer was between 1.2 and 1.3. It was neutralized with calcium hydroxide, washed three times by stirring with water, and dried at 140° C.

The polymer flake was redissolved in dimethylacetamide after which lithium chloride and lithium nitrate salts were added. The pH, as measured by a glass electrode, was adjusted to 6 to 7 by the addition of an aqueous slurry of lithium hydroxide. The resulting solution contained 24 percent polymer, 6 percent lithium chloride and 15.5 percent lithium nitrate. The solution was filtered and concentrated to 28.5 percent polymer for spinning by applying heat and vacuum.

The concentrated solution, i.e., the spinning solution, was spun through a spinneret of 150 annular holes of the type described by Burke et al. in U.S. Pat. No. 3,397,427. The solution temperature was 125° C.

The spun fibers were passed through a 19 foot by 9 inch diameter cell maintained at 160°–180° C and supplied cocurrently with an inert aspiration gas (nitrogen) at 185° C.

On leaving the cell, the partially dried fiber was quenched with liquor at 13° C. It was then piddled at 127 yards per minute into a container while spraying liquor at 13° C into the container. The liquor for the quench and piddler was recycled and maintained at 4.2 percent dimethylacetamide in water as measured by refractive index. The liquor contained 278 p.p.m. polyethylene glycol monostearate at the start of piddling.

The piddled fiber was then extracted and annealed on a two stage counter current extraction system by recycling liquor from each stage, through a spray, over the fiber. Temperature was 50° C. Time on each stage was 8 hours. Pure water was fed into the last stage. The liquor from the first stage was used to maintain the quench liquor at 4.2 percent dimethylacetamide as measured by refractive index.

Extracted fibers were characterized by constructing and running permeators and measuring fiber outside diameters. From the permeator results, fiber inside diameter, salt passage, and a water permeability constant were obtained.

The fiber outside diameter was obtained by measuring the volume of water displaced by a given length and number of fibers.

$$OD = \left[ \frac{4 \times V}{\pi \times L \times N} \right]^{\frac{1}{2}} \times 10^4$$

where:
V = volume of water displaced in cubic centimeter,
L = fiber length in centimeters,
N = number of filaments,
OD = fiber outside diameter in microns.

The permeators were made as a double ended permeator from a single strand of fibers (150 filaments) but tested as a single ended permeator. A 150 filament skein of hollow fibers was doubled to obtain 300 parallel fibers and while wet with water, was inserted into a rigid tube fitted with two side tubes at one end. The two ends of the 150 filament skein were placed in the two side tubes and sealed with epoxy resin. The loose ends outside the tube were cut to open the hollow fibers for fluid flow. To the one side tube, a pressure gauge was attached to measure the dead end tube pressure. The permeators had an active length of 30 inches and a pot length of 4 inches. The permeators were tested at 25° C. with shell side feed at 400 psig and a conversion, (i.e., permeate rate over feed rate × 100) of 4 to 6 percent using 5,000 parts per million of sodium chloride in water.

The fiber inside diameter was calculated from the equation $$ID = \left[ \frac{7.05 \times 10^{10} \times F \times (Lp + La/2)}{Pd \times N} \right]^{\frac{1}{4}}$$

where:
ID = fiber inside diameter in microns,
F = permeator flux in gallons per day,
Lp = pot length of permeator in feet,
La = active length of fiber in permeator in feet,
Pd = dead end tube pressure, pounds per square inch gauge,
N = number of filaments in permeator.

This equation is valid as long as the dead end tube pressure is less than two-thirds the feed pressure.

The percent salt passage, SP, was calculated from the equation $$SP = \frac{\text{Concentration of salt in permeate}}{\text{Concentration of salt in feed}} \times 100.$$

The water permeability constant, Kw, for films is defined as $$F = Kw \times A \times Pe$$

where:
F = permeation rate in gallons per day
A = area of the film through which permeation occurs, square feet.
Pe = the effective pressure in pounds per square inch
= hydraulic pressure drop across the film minus the difference in osmotic pressure across the film,
Kw = water permeability constant, gallons per square feet per day per pounds per square inch. The equation used for fiber, using the same definition for water permeability constant as for films, was $$F = \frac{1.031 \times 10^{-5} \times ID^4 \times Kw \times OD \times N \times La \times Ps}{ID^4 + 7.236 \times 10^5 \times Kw \times OD \times La \times (Lp + La/3)}$$

where Ps = feed pressure minus the osmotic pressure difference between solution on outside of fiber and permeate. The other terms are as previously defined. The restriction on this equation is the same as that for the equation for the fiber inside diameter. In terms of Kw, the equation becomes $$Kw = \frac{ID^4 \times F}{OD \times La \times (1.031 \times 10^{-5} \times Ps \times ID^4 \times N - 7.236 \times 10^5 \times F \times (Lp + La/3))}$$

which was used to calculate the water permeability constant.

For a sample of fiber using polyethylene glycol monostearate of 600 mol wt at 278 p.p.m. in the rinse medium the OD was 87.3 microns, the ID was 41.4 microns, the Kw was 13.5 × 10⁻³ gallons per square foot per day and the S.P. was 6.8.

For a sample of fiber using polyethylene glycol monostearate of 1000 mol wt at 278 p.p.m. in the rinse medium the OD was 87.3 microns, the ID was 41.0 microns, the Kw was 13.6 × 10⁻³ gallons per square foot per day and the S.P. was 6.8.

For a control sample using no polyethylene glycol monostearate in the rinse medium, the OD was 87.3 microns, the ID was 41 microns, the Kw was 12 × 10⁻³ gallons per square foot per day per spi, and the S.P. was 4.1%.

EXAMPLE II

A film was prepared by casting a room temperature solution of polymer in dimethylacetamide onto a glass plate at 100° C, using a doctor knife set at 15 mil and dried for 10 minutes. The film was then quenched in a rinse medium at room temperature for one hour.

The film was then placed in a reverse osmosis test cell like that shown in FIG. 1 of Richter and Hoehn U.S. Pat. No. 3,567,632. The water feed mixture (entered into the cell at 600 psi) was 0.5% NaCl in water. The casting solution employed contained 15% of a polymer synthesized from a mixture of 4-aminobenzhydriazide (80 mol %) and 3-aminobenzhydrazide (20 mol %), and a mixture of isophthaloyl chloride (70 mol %) and terephthaloyl chloride (30 mol %); and 50%, based on polymer, of LiN03. The rinse medium was water containing 5,000 p.p.m. (0.5%)

$$C_{14}H_{29}-CH\begin{matrix}COO^{\ominus}\\N^{\oplus}(CH_3)_3\end{matrix}$$

The water flux rate was 30 gallons per square foot per day per psi and the salt passage was 2.2%. In contrast with no surfactant present the water flux rate was 24 gallons per square foot per day and the salt passage 1.6%.

EXAMPLE III

The casting solution employed contained 15% of a polymer made from a mixture 88.5 mol % m-phenylene diamine and 11.5 mol % 4-calcium sulfonate m-phenylene diamine and a mixture of isophthaloyl chloride (70 mol %) and terephthaloyl chloride (30 mol %). The solution also contained 15% LiNO₃ and 5.7% LiCl, based on polymer. The solution at room temperature was cast onto a hot plate at 100° C. with a doctor knife and dried for five minutes and then placed in the rinse medium at room temperature for one hour. Five thousand p.p.m. of surfactant was in all rinse media except the control. The film was placed in a reverse osmosis cell like the one used in Example II and the water feed used was as in Example II. Results were as follows:

| Surfactant in Rinse | Water Flux gallons per square foot per day | Salt Passage (%) |
|---|---|---|
| None (Control) | 15.4 | 2.1 |
| $C_{14}H_{29}-CH\begin{smallmatrix}COO^{\ominus}\\N(CH_3)_3^{\oplus}\end{smallmatrix}$ | 21.5 | 4.1 |
| Sodium stearyl sulfate (containing some other long-chain impurities) | 17.0 | 0.9 |
| CH₃C(CH₃)₂CH₂C(CH₃)₂— | 16.4 | 4.4 |

| Surfactant in Rinse | Water Flux gallons per square foot per day | Salt Passage (%) |
|---|---|---|
| 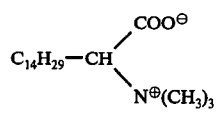 —(OCH₂CH₂)₁₀—OH | | |

Substantially the same results were obtained when the polymer employed was like the one used in this Example except that 79.5 mol % m-phenylene diamine and 20.5 mol % 4-calcium sulfonate m-phenylene diamine were used in place of the diamine mixture used in the polymer described above.

EXAMPLE IV

The casting solution employed contained 15% of a polymer made from a mixture of 79.5 mol % m-phenylene diamine and 20.5 mol % 4-calcium sulfonate m-phenylene diamine and a mixture of isophthaloyl chloride (70 mol %) and terephthaloyl chloride (30 mol %). The solution also contained 15% LiNO₃ and 5.7% LiCl, based on polymer. The solution at room temperature was cast on a hot plate at 100° C. and dried for 15 minutes. The film was then placed in a rinse medium at 13°–15° C. for 30 minutes, and then annealed in water at 65° C. for one hour. The rinse medium was water containing 800 p.p.m. surfactant, except in the control. The film was placed in a reverse osmosis cell like the one used in Example II and the water feed used was as in Example II. Results were as follows:

| Surfactant in Rinse Medium | Water Flux gallons per square foot per day | Salt Passage % |
|---|---|---|
| None (Control) | 5.32 (average) | 0.95 (average) |
| Polyethylene glycol monostearate 1000 | 6.99 (average) | 1.89 (average) |
| $C_{14}H_{29}-CH\begin{smallmatrix}COO^{\ominus}\\N(CH_3)_3^{\oplus}\end{smallmatrix}$ | 9.56 (average) | 2.55 (average) |
| A-13 carbon branched nonyl primary alcohol containing ethylene oxide units | 8.20 (average) | 5.8 (average) |
| Sodium Lauryl sulfate | 7.1 (average) | 6.0 |

We claim:

1. In the process for preparing a permselective membrane, which comprises extracting an unextracted membrane comprising
   A. a water-miscible organic polar aprotic solvent present in the unextracted membrane in an amount of between about 20% and about 75% by weight based on weight of unextracted membrane;
   B. a substantially linear, aromatic, synthetic, organic, nitrogen-linked, condensation polymer present in the unextracted membrane in an amount of between about 25% and about 80% by weight based on total weight of the unextracted membrane;
   C. at least one salt which is soluble in the solvent and is present in the unextracted membrane in an amount of between about 10 and about 100% by weight based on weight of polymer;

with a rinse medium which is miscible with the solvent, is a solvent for the salt, is practically chemically inert toward the polymer and is practically a nonsolvent for the polymer; the improvement which comprises employing in the rinse medium between about 50 p.p.m. and 10,000 p.p.m. of a surfactant having a molecular weight between about 200 and about 7000, and containing (a) at least one hydrophobic moiety having a molecular weight of between about 100 and about 400 and being a hydrocarbyl group or such a hydrocarbyl group substituted with halogen (F, Cl, Br or I), —NO$_2$ or —OH; and (b) at least one hydrophilic moiety, said surfactant being i. a nonionic surfactant or;
   ii. an anionic surfactant or;
   iii. an amphotylic surfactant of the formula

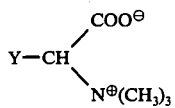
(1)

wherein Y is hydrocarbyl of between about 6 and about 20 carbon atoms which can be substituted with halogen, —NO$_2$ or —OH.

2. The process of claim 1 wherein the surfactant defined therein is a nonionic surfactant.

3. The process of claim 2 wherein the nonionic surfactant is the reaction product of (1) ethylene oxide and optionally propylene oxide, with (2) an alcohol, carboxylic acid or alkyl phenol.

4. The process of claim 3 wherein the nonionic surfactant has the formula

wherein R is alkyl of between about 8 and about 20 carbon atoms and n is a cardinal number of between 8 and 18.

5. The process of claim 4 wherein the nonionic surfactant is polyethylene glycol monostearate present in the rinse medium in an amount of between about 100 p.p.m. and about 5000 p.p.m. based on rinse medium.

6. The process of claim 4 wherein the condensation polymer has the formula

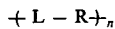

wherein

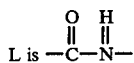

R is phenylene which can be substituted with a carboxyl or sulfonic acid group, and n is an integer sufficiently large to provide a film-forming molecular weight.

7. The process of claim 6 wherein the solvent has the formula

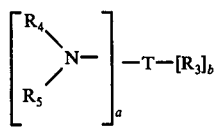

where R$_3$, R$_4$, and R$_5$ independently may be the same or different and are 1 to 4 carbon alkyl, or any two of R$_3$, R$_4$ or R$_5$ taken together can be an alkylene radical so chosen that the total number of carbon atoms in all of R$_3$, R$_4$ and R$_5$ is not more than 6, $a$ is 1 or 2, $b$ is 0 or 1, T is an acidic radical such as

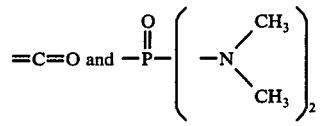

and the sum of $a + b$ is such as to satisfy the above-indicated valences of the radical T.

8. The process of claim 1 wherein the surfactant defined therein is an anionic surfactant.

9. The process of claim 2 wherein the anionic surfactant has the formula

AM where M is a cation and A is an anion containing a hydrophobic hydrocarbyl group of between about 8 and about 20 carbon atoms.

10. The process of claim 9 wherein in the anionic surfactant M is Na$^+$, Li$^+$ or NH$_4^+$ and A is the anion R″A′— wherein R″A′— is alkyl of between about 8 and about 20 carbon atoms and A′ is —COO$^-$, —SO$_3^-$ or —OSO$_3^-$, and the surfactant is present in the solution in an amount of between about 100 p.p.m. and about 5000 p.p.m. based on rinse medium.

11. The process of claim 9 wherein the condensation polymer has the formula

wherein

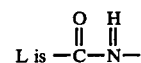

R is phenylene which can be substituted with a carboxyl or sulfonic acid group, and n is an integer sufficiently large to provide a film-forming molecular weight.

12. The process of claim 11 wherein the solvent (a) has the formula

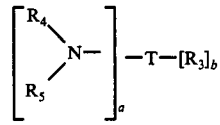

where R$_3$, R$_4$ and R$_5$ independently may be the same or different and are 1 to 4 carbon alkyl or any two of R$_3$, R$_4$ or R$_5$ taken togethe can be an alkylene radical so chosen that the total number of carbon atoms in all of R$_3$, R$_4$, and R$_5$ is not more than 6, $a$ is 1 or 2, $b$ or 0 or 1, T is an acidic radical such as

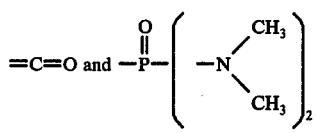

and the sum of $a + b$ is such as to satisfy the above-indicated valances of the radical T.

13. The process of claim 1 wherein the surfactant defined therein is an ampholytic surfactant of the formula

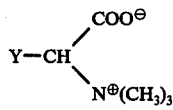

wherein Y is hydrocarbyl of between about 6 and about 20 carbon atoms which can be substituted with halogen, $-NO_2$ or $-OH$.

14. The process of claim 13 wherein the surfactant has the formula

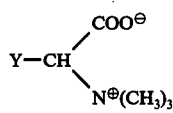

wherein Y is alkyl of 8–15 carbon atoms, and the surfactant is present in the solution in an amount of between about 100 p.p.m. and 5000 p.p.m. based on rinse medium.

15. The process of claim 14 wherein the condensation polyme has the formula

wherein

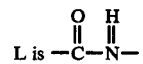

R is phenylene which can be substituted with a carboxyl or sulfonic acid group, and
n is an integer sufficiently large to provide a film-forming molecular weight.

16. The process of claim 15 wherein the solvent (a) has the formula

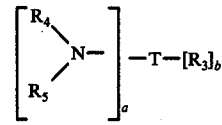

where $R_3$, $R_4$ and $R_5$ independently may be the same or different and are 1 to 4 carbon alkyl or any two of $R_3$, $R_4$ or $R_5$ taken together can be an alkylene radical so chosen that the total number of carbon atoms in all of $R_3$, $R_4$, and $R_5$ is not more than 6, $a$ is 1 or 2, $b$ is 0 or 1, T is an acidic radical such as

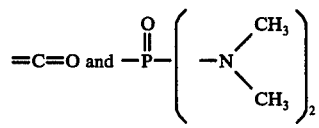

* * * * *

UNITED STATES PATENT OFFICE
CERTIFICATE OF CORRECTION

PATENT NO. : 4,087,388
DATED : MAY 2, 1978
INVENTOR(S) : James Henry Jensen and Lynn E. Applegate It is certified that error appears in the above-identified patent and that said Letters Patent are hereby corrected as shown below:

In Column 20, line 30, " R"A' - wherein R"A' ‾ " should read -- R"A'⊖ wherein R" --.

In Column 20, line 64, "togethe" should read -- together --.

Signed and Sealed this

Twenty-fourth Day of October 1978

[SEAL]

Attest:

RUTH C. MASON
Attesting Officer

DONALD W. BANNER
Commissioner of Patents and Trademarks